(12) United States Patent
Jenkins et al.

(10) Patent No.: US 12,425,725 B2
(45) Date of Patent: *Sep. 23, 2025

(54) MULTIPLE ENTITY VIDEO CAPTURE COORDINATION

(71) Applicant: INTERNATIONAL BUSINESS MACHINES CORPORATION, Armonk, NY (US)

(72) Inventors: Jana H. Jenkins, Raleigh, NC (US); Jeremy R. Fox, Georgetown, TX (US); Mauro Marzorati, Lutz, FL (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 669 days.

This patent is subject to a terminal disclaimer.

(21) Appl. No.: 17/704,471

(22) Filed: Mar. 25, 2022

(65) Prior Publication Data

US 2023/0308750 A1 Sep. 28, 2023

(51) Int. Cl.
*H04N 23/661* (2023.01)

(52) U.S. Cl.
CPC .............................. *H04N 23/661* (2023.01)

(58) Field of Classification Search
CPC ..... H04N 23/661; H04N 23/695; H04N 23/90
See application file for complete search history.

(56) References Cited

U.S. PATENT DOCUMENTS

| | | |
|---|---|---|
| 9,110,988 B1 | 8/2015 | Tan |
| 9,369,635 B1 | 6/2016 | Hilla |
| 9,798,933 B1 | 10/2017 | Meisser |
| 9,992,400 B2 | 6/2018 | Burtey |
| 10,142,540 B1 | 11/2018 | Ribeiro et al. |
| 10,158,897 B2 | 12/2018 | Baughman et al. |
| 10,277,813 B1 | 4/2019 | Thomas et al. |
| 10,389,827 B2 | 8/2019 | Baughman et al. |

(Continued)

FOREIGN PATENT DOCUMENTS

| | | |
|---|---|---|
| CN | 108024094 A | 5/2018 |
| WO | 2023/179251 A1 | 9/2023 |

OTHER PUBLICATIONS

Notification of Transmittal of the International Search Report and the Written Opinion of the International Searching Authority, or the Declaration, International Application No. PCT/CN2023/076192, Jun. 7, 2023, 8 pgs.

(Continued)

*Primary Examiner* — Christopher K Peterson
(74) *Attorney, Agent, or Firm* — James L. Olsen

(57) ABSTRACT

A capture operation is identified. The capture operation is performed by a first capture device. The capture operation is of a video steam of a subject that is located in an environment. The video stream includes a perspective of the subject. A capture limitation of the first capture device, related to capturing the subject, is determined. In response to the capture limitation one or more candidate capture devices in the environment are detected. A second capture device is selected as a selected capture device, from the one or more candidate capture devices. The second capture device is instructed to perform the capture operation. The video stream is transferred from the first capture device to the second capture device; the transfer maintains the perspective.

20 Claims, 7 Drawing Sheets

(56) References Cited

U.S. PATENT DOCUMENTS

| | | |
|---|---|---|
| 10,429,926 B2 | 10/2019 | Bastian et al. |
| 10,819,810 B2 | 10/2020 | Baughman et al. |
| 10,893,206 B1 | 1/2021 | Bart |
| 11,831,982 B2 * | 11/2023 | Jenkins .................. H04N 5/268 |
| 2005/0193421 A1 * | 9/2005 | Cragun .............. H04N 21/2743 386/234 |
| 2007/0229708 A1 | 10/2007 | Van Geel |
| 2009/0147070 A1 | 6/2009 | Marathe et al. |
| 2009/0160933 A1 | 6/2009 | Herz |
| 2010/0214419 A1 | 8/2010 | Kaheel et al. |
| 2011/0267433 A1 | 11/2011 | Thorpe et al. |
| 2012/0066598 A1 | 3/2012 | Oks et al. |
| 2013/0328997 A1 | 12/2013 | Desai |
| 2014/0133825 A1 | 5/2014 | Kozloski et al. |
| 2014/0140675 A1 | 5/2014 | De Sa et al. |
| 2014/0267747 A1 | 9/2014 | Kritt et al. |
| 2016/0101358 A1 | 4/2016 | Ibrahim |
| 2018/0196260 A1 | 7/2018 | Ekambaram et al. |
| 2021/0343126 A1 | 11/2021 | Drako |
| 2022/0311952 A1 | 9/2022 | Vanka |

OTHER PUBLICATIONS

Mell et al., "The NIST Definition of Cloud Computing," Recommendations of the National Institute of Standards and Technology, U. S. Department of Commerce, Special Publication 800-145, Sep. 2011, 7 pages.

"The Future of Video with Watson," IBM, Watson Media, Printed Mar. 21, 2022, 5 pages https://video.ibm.com/.

Wu, "Learning Curve: Managing a Successful Gimbal Handoff," The Beat, Dec. 17, 2019, 8 pages https://www.premiumbeat.com/blog/video-tutorial-gimbal-hand-off/.

"DJI Ronin—Behind the Scenes of a Long Take," DJI, Apr. 22, 2014, 7 pages https://www.youtube.com/watch?v=XIqVABCrX5A.

Javed et al., "Camera handoff: tracking in multiple uncalibrated stationary cameras," IEEE, Proceedings Workshop on Human Motion, 2000, 6 pages, https://ieeexplore.ieee.org/document/897380.

Jenkins et al., "Multiple Entity Video Capture Coordination," U.S. Appl. No. 17/704,719, filed Mar. 25, 2022.

List of IBM Patents or Patent Applications Treated as Related, Dated Mar. 22, 2022, 2 pages.

* cited by examiner

MULTIPLE ENTITY VIDEO CAPTURE COORDINATION

BACKGROUND

The present disclosure relates to video capture, and more specifically, to coordinating multiple devices configured to capture a subject.

Video is a medium of consumption that includes multiple still images. Video can provide an impact to a viewer by various attributes of the video, such as the scene, the setting, and other relevant content attributes. The perspective of a video is one content attribute that can increase the quality or usefulness of a video media.

SUMMARY

According to embodiments, disclosed are a method, system, and computer program product.

A capture operation is identified. The capture operation is performed by a first capture device. The capture operation is of a video steam of a subject that is located in an environment. The video stream includes a perspective of the subject. A capture limitation of the first capture device is determined. The capture limitation is related to the first capture device capturing the subject. In response to the capture limitation one or more candidate capture devices in the environment are detected. A second capture device is selected as a selected capture device from the one or more candidate capture devices. The second capture device is instructed to perform the capture operation. The instructing is based on the selected capture device. The video stream is transferred from the first capture device to the second capture device; the transfer maintains the perspective.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
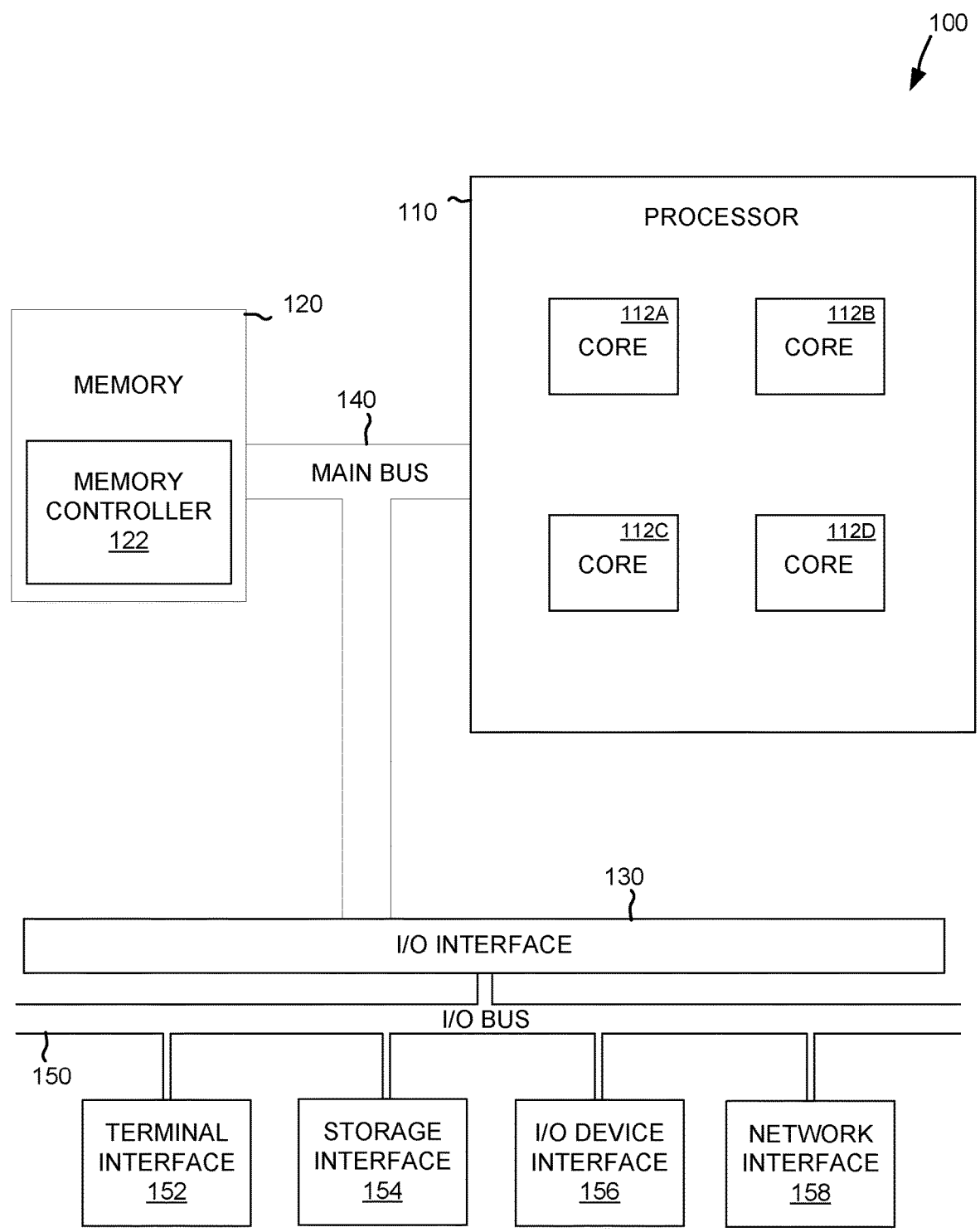
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to video capture, more particular aspects relate to coordinating multiple devices configured to capture a subject. While the present disclosure is not necessarily limited to such applications, various aspects of the disclosure may be appreciated through a discussion of various examples using this context.

Video is a medium that garners information and can provide enjoyment for many individuals' daily lives. Further, the prevalence of network connected computing devices has increased video consumption. Specifically, video streams may be shared widely with the broadened reach of sharing sites. For example, many millions of viewers seek out various subjects to watch in video media daily through broadcast networks and through the Internet. In various situations, video streams are produced and shared for various types of news incidents, sports, events, etc.

Another increase in the consumption and sharing of video is that of the proliferation of relatively inexpensive devices capable of capturing video. Specifically, as smartphones, tablets, personal digital assistants, and other relatively inexpensive computing devices have proliferated, so too has the proliferation of cameras. For example, in many lifestyles, a large majority of users have settled on using a smartphone as the primary or only form of computing device in their lives. One reason this majority of users has chosen a smartphone because it is relatively portable, and because it functions as a relatively high-quality video capture device. These users often travel to various environments and almost always carry a smartphone, so that they may capture and share video with friends, family, and the public at large. In another example, many individuals may own and/or operate unmanned autonomous vehicles ("UAVs") for recreational use. Again, the UAVs may almost always be equipped with a camera which facilitates for the capture of various environments. The footage of capture from the UAVs may be very compelling, as these devices may be able to capture aerial or panning shots of various subjects that are unusual, interesting, or otherwise visually arresting.

Video that is well composited or created may be helpful to a variety of uses. For example, video continuity may be helpful to maximize understanding of the subject in an educational video. In another example, watching entertainment programming, seamless video may lead to more immersion of the viewer. In yet another example, for investigative purposes, jarring or large changes in video may make a video less understandable for users that are trying to recreate footage of an incident. One aspect of video media that relates to its usefulness is that of the perspective of viewing a particular subject. A video capture that contains continuity and/or uninterrupted perspectives or other composition features can be a benefit for viewers.

With the proliferation and democratization of video capture devices, there may be drawbacks in creating a video that has a quality perspective. Specifically, it may be difficult to plan, coordinate, or otherwise capture and create video from a plurality of capture devices that compares favorably with the composition value of professionally shot video. One drawback relates to efficiency in creating a video with multiple capture devices. For example, in an environment where multiple capture devices are operating, creating a video may result in wasteful or overlapping video that could be covering the same target area from similar perspectives. Another drawback may be in the ability to capture a perspective this is actually desirable and/or useful. For example, capture devices may be operated by individual users without expertise in understanding how to composite a video. These individual users may not know how to coordinate video creation efforts with others, which may lead to a jarring or incomplete video.

Yet another drawback is that various individuals may have short attention spans, or may not have the ability to navigate through uneven terrain or around larger subjects. For example, a user may not be able to fully walk around a building to create a video that circles the building due to a lack of walking endurance. In another example, many users may be crowded around a single subject, such as a sporting event, and the crowd may prevent a capture device of one user to gracefully move around the sporting event to capture all angles. In the case of user operated UAVs, users may also face difficulty in successful operation and video capture. For example, users of UAVS may have difficulty in directing a UAV as the controls of the UAV may be cumbersome or unintuitive, and so a user may not be able to move quickly enough, or to change the location or position of a UAV for a quality video capture. In another example, a user may have difficulty piloting a UAV and accurately capturing usable or quality video that maintains a perspective or provides a reasonable continuity when changing perspectives.

Yet still another set of drawbacks may be capture device limitations that impede the capture device from fully capturing the subject. One device limitation may be that capture devices have relatively small or limited power sources, such as batteries. These power sources may limit the amount of time or footage that can be captured. Both smartphones and UAVs may not be able to capture a single shot that is longer than twenty or thirty seconds without frequent stops to replenish the battery. In this case, an orchestrated handoff or transfer of the video may be more useful than a single continuous shot. For example, a UAV may have a limited battery that is not capable of powering the UAV to capture the entire area or for the entire duration. Another device limitation is that of storage space. Many smartphones and UAVs do not have interchangeable storage devices and so they may be limited to capturing and offloading video that is relatively short (e.g., less than a minute long).

More technologically complicated video capture devices may exist, but there are drawbacks to these complicated devices. For example, a complicated video capture device may be relatively expensive and may not be at the location of every subject. In another example, a complicated video capture device may be relatively heavy. In such cases, a user may have trouble carrying the complicated video capture device for any amount of time without fatigue or without the video suffering from shaky or uneven capture. Further, a complicated capture device may involve mounting the device on a relatively large and/or loud UAV that may not be able to maneuver through the environment or may scare or distract the subject. Another drawback is that an environment may be closed off and/or permits may need to be acquired as a precursor to capturing video with complicated capture devices.

Further, there exists a need for video streams to be increasingly interactive. Specifically, live videos of any event can be captured by multiple people from different directions, or different direction of any surrounding can be captured in live video. The receiving party of the live videos might want to view larger coverage and might want to view the event from different directions, and currently selected live video feed may not be sufficient for the user, the capturing device may not have the endurance to maintain continuous coverage of the desired subject, or it might not be possible for some reason (weather, terrain, security, etc. to continue or move to provide a different perspective).

Multiple Entity Video Capture Coordination ("MVC") may operate to overcome the various drawbacks in capturing video from multiple capture devices (e.g., smartphones, UAVs, Augmented Reality ("AR") glasses, video cameras). MVC may operate to aggregate video of multiple video capture devices and orchestrate a single video stream that benefits from capture operations of multiple capture devices. The MVC may operate based on the physical position, the relative direction, and the field of view and/or angle of view of capture devices. The MVC may operate in relation to a subject in a video. Specifically, a video stream that is to be watched or consumed by a viewing device and may have a perspective of an environment. More specifically, the perspective of a video stream may be the perspective of a subject in the environment. The MVC may operate by recording, filing, or otherwise capturing the subject from the perspective (e.g., performing a capture operation of a specific perspective). The MVC may also coordinate the transfer of a video stream. For example, the MVC may execute a relay, hand-off, or other relevant switch in capturing duties between a first capture device and a second capture device. The MVC can be carried out repetitively (over and over— from camera to camera to camera, etc.) for numerous digital transfers. The result of the repeated operation may be a longer length live shooting experiences that approximates or reproduces the movements and perspective changes of a single capture device.

The MVC may operate in response to a viewing device, to perform capture operations of a video stream and to update the perspective of video stream. In detail, while watching a live video of any environment, subject, or surrounding, the participating users can define an update or change to a perspective from one or more defined viewing parameters. The defined viewing parameters related to a change in perspective may be defined as a change in direction (rotating), position (e.g., panning), and/or field of view ("FOV") (alternatively, angular field of view) (e.g., zoom). The viewing device may capture a request for an update to a perspective. For example, a viewing device may capture gesture commands, voice commands, mouse input, mouse pointer movement, head movement from head tracking, etc. Responsive to the input from the viewing devices, the MVC may update the perspective (e.g., direction, position, FOV) of a video stream. The MVC may update the perspective by selecting a second capture device to take over capture actions from a first capture device. For example, the MVC may transfer the capture from a first capture device to a second capture device. Further, the MVC may update the perspective by adjusting a capture operation of one or more of the capture devices. For example, the MVC may instruct a first capture device to adjust a position, a direction, aperture adjustment, exposure amount, motion compensation, or a field of view. In another example, the MVC may instruct a second capture device to adjust similar attributes.

Consequently, the MVC may provide an interactive aggregate video stream that may be updated based on a viewing device of a user. For example, all viewing devices may be able to navigate through a plurality of video capture devices that each have different perspectives and may be able to direct the capture of a video stream. In some embodiments, the video stream may be transferred from a first capture device and to a second capture device while maintaining the perspective of the video stream. In some embodiments, the video stream may be transferred from a first capture device and to a second capture device by providing a second or new perspective of the video stream. The viewing demand may be identified from various viewers and an updated perspective may be determined by the MVC.

The viewing requests and/or demands of an updated perspective may include the demands of a single viewer. For example, if one viewer is watching the video stream, and the single viewer requests that the video stream pan to the left three feet while circling a subject, the MVC may direct, prompt, or otherwise cause an adjustment to the video stream to pan to the left three feet while circling a subject.

The viewing demands may be based on a plurality of viewers. For example, one or more viewing devices may be viewing a video stream of a first capture device in an environment. The MVC may cause an adjustment to the video stream based on or in consideration of all of the viewing devices that are viewing the video stream. The adjustment may be a mean, median, or other relevant technique to adjust a capture device based on an average of the viewing devices. For example, twenty-three viewing devices may request a video to pan to the right by twelve feet while centering on the subject. Continuing the example, fifteen additional viewing devices may request the video to pan to the left four feet while centering on the subject. Further continuing the example, the MVC may average the inputs from all the viewing devices and the MVC may cause an adjustment of a pan that is approximately five to six feet to the right. The adjustment may be based on a subset or single viewing device request. For example, if multiple viewing devices request differing perspective updates, the MVC may rank the differing perspective updates. The ranking may be based on one or more factors (e.g., a perspective update request ranked higher for being similar to others request, a perspective update request ranked higher for being a smaller perspective update, a perspective update request ranked higher for consuming less resources to perform).

The adjustment may be that of directly directing or adjusting the capture operation of a capture device (e.g., adjusting the video device based on the one or more defined viewing parameters). For example, if a first capture device is mounted to a UAV, and the request is to adjust the FOV to tighten in on a subject, the MVC may directly adjust an FOV setting of the UAV. The adjustment may be an indirect adjustment of a capture device. For example, if a user is directly operating a smartphone, UAV, or other capture device. The MVC may determine the adjustment and generate one or more instructions for the user. The user may be informed by the capture device displaying or providing the required instructions (e.g., a statement saying "pan to the left" on a display of the capture device, an arrow indicating a rotation to the left on a display of the capture device, a plurality of arrows to the right on a display of the capture device indicating multiple users prefer the video to be rotated slightly to the right).

The MVC may operate to handoff or transfer video to various available additional capture devices. The MVC may detect the various additional capture devices that may be useful as candidate capture devices to take over or transfer the video stream to. The detection may include broadcasting a request to other various additional capture devices. For example, a video stream of a first subject in an environment may be captured by a first capture device. The MVC may transmit a network request for additional capture devices. The network request may be transmitted through a local network, such as a wireless network or a personal area network. The network request may be in the form of a broadcast request that is sent out without direction to any particular additional device. The network request may be broadcast in the environment or in a proximity to the environment. For example, the MVC may detect that a first capture device is a smartphone capturing a Ferris Wheel from the north side of the Ferris Wheel at an amusement park. The MVC may determine based on one or more contextual data points (e.g., Global Position System information, image detection) the environment around the Ferris Wheel and may further broadcast a network request to various capture-capable devices in range. The broadcast may be to areas that are within proximity of the environment. For example, the amusement park may have one or more shops or theaters that are also near the Ferris Wheel but are not outside in the environment and in view of the environment. The MVC may still, despite no direct line of sight to the Ferris Wheel, still broadcast the request for additional capture devices to the environment.

To transfer a video stream from a first capture device to a second capture device, the MVC may select from or narrow down from multiple candidate capture devices. The selection of a candidate capture device may be based on a limitation of the first capture device. Specifically, a limitation of the first capture device may be detected and responsively, the MVC may begin to seek out additional capture devices that may overcome the limitation. The limitation may be related to a storage status or other storage limitation of the first capture device. For example, the first capture device may be a UAV with a limited storage on its memory card that is almost full. The MVC may detect that the UAV is running low on storage and may select another candidate as a selected capture device to continue providing the video stream; a candidate may be selected that has a relatively free amount of storage. The limitation may be related to a power status or power limitation of the first capture device. For example, the first capture device may be a smartphone that has been recording a view of a nature exhibit for a few minutes and live streaming the nature exhibit. The smartphone may be running low on battery, such that the battery has an indicated charge of less than twenty percent battery charge remaining. Based upon the battery being at twenty percent charge a power status may indicate to the MVC that there is a capture limitation of the first device. Upon detecting a plurality of candidate capture devices, the MVC may select a candidate capture device from the plurality of candidate capture devices. The selected capture device may be a candidate capture device that has a greater power status than the first capture device. For example, a candidate capture device may be selected from the plural candidate capture devices, if the selected capture device has a greater battery charge than the first capture device.

The selection of a candidate capture device by the MVC may be based on other criteria. One selection criterion may be based on a prediction of a demand from viewing devices. Specifically, the MVC may record the historical viewing of previous captures. The historical viewing may be stored and related to a particular capture device. For example, the MVC may store and record previous captures of a smartphone of a first user or a UAV of a second user. The historical viewing may be stored and related to a particular environment. For example, the MVC may store and record one or more viewing parameters that relate to previous sessions of an outdoor nature exhibit. The selection of a candidate capture and the instruction of how to perform capture operations may be generated by the MVC based on the historical viewing. For example, at a first sporting event in the past, a viewer may define one or more viewing parameters such as a pan around certain moves or sporting tactics that occur or are related to a person scoring a goal. At a later date, a second sporting event may occur. The MVC may predict demand for viewing devices of the second sporting event and may proactively instruct capture devices to perform capture operations that are consistent with the capture operations of the first sporting event. Another selection criterion may be a capture limitation of the first capture device in continuing to perform or respond to performing a capture operation.

In a first example, a first user may be recording a video from their smartphone and may enable the video to be shared and accessible to users as part of a live streaming event. The user's smartphone may direct them to walk behind a statue at a park. The user may be responsive to the request and may begin to walk around from the front of the statue, but upon reaching the side of the statue the user may slow down or stop moving. The user may not continue to move because other users may block a walking path of the user, or because the user is no longer interested in performing the capture operation. Responsive to the user not moving anymore, the MVC may detect a capture limitation in the first user device in continuing to perform the capture operation of the live stream. Further, and in response to the capture limitation, the MVC may send out a request for additional capture devices, and responsively the MVC may identify one or more candidate capture devices that are complying by moving into the position or proximity or a handoff zone of the first capture device. If no devices are capable of becoming proximate to the first capture device, the MVC may select from the candidate capture devices based on one or more of the capture devices that are relatively close to or near the handoff zone or proximity.

In a second example, the MVC may calculate the demand of a plurality of viewing devices. The MVC may determine one or more parameters such as the defined viewing parameters. The defined viewing parameters may include a time component. Specifically, one or more of the viewing devices may include a request that also indicates a time component for the position, the direction, and the FOV. The time component may include the duration that a particular capture may take place. For example, a viewing device may indicate that a pan at approximately two to three miles per hour for twenty seconds while circling a subject may be received by the MVC from a viewing device. The MVC may identify a capable capture device, such as a UAV or a person with a camera that is able to move at such a rate of speed and that is also proximate to the environment of the subject.

The MVC may provide for benefits compared to other methods of capturing a subject. Specifically, the MVC may facilitate a capture from users that do not have steady or consistent control of a video capture. In addition, the MVC may permit a capture device to successfully capture long sustained single shot perspectives that are comparable in quality to those created with complicated or professional capture devices, but without the use of expensive equipment. For example, a MVC may facilitate a single shot that moves through an environment or quickly panning or shifting perspective without the use of dollies, gimbals, or tracks. The MVC may also reduce the cost and complexity around certain single shot perspectives and shifting perspectives, and without the need of large or heavy cameras, UAVs, smartphones, or other complicated capture devices.

In some embodiments, the MVC may operate to render a specific perspective. Specifically, in response to detecting a user accessing a live video, the MVC may operate by identifying and aggregating different perspectives (e.g., FOVs) of the live video. The different perspectives may correspond to different capture device that are currently capturing live video at different physical positions in an environment. The MVC may receive one or more defined parameters from a viewing device that demand an updated perspective (e.g., the continuation of a perspective, the shift from a first perspective to a second perspective). In response to receiving the defined parameters, one or more of the capture devices may be directed to capture the updated perspective. The notification by the MVC to any of the capturing devices may be based on a location of a capture device. For example, a subset of the capture devices (but not others) may be notified that are proximate to the current perspective and/or the updated perspective. The notification communicated by the MVC to any of the capturing devices may include the one or more defined parameters.

In some embodiments, a capture operation of a video steam of a subject may be identified. The capture operation is performed by a first capture device. The subject is located in an environment. The video stream includes a perspective of the subject. A capture limitation of the first capture device is determined. The capture limitation is related to the first capture device capturing the subject. One or more candidate capture devices are detected in the environment in response to the capture limitation. A second capture device is selected from the one or more candidate capture devices as a selected capture device. The second capture device is instructed to perform the capture operation based on the selected capture device. The video stream is transitioned and/or transferred from the first capture device to the second capture device. The transfer maintains the perspective of the video stream. In some embodiments, a transfer zone is identified before transferring the video stream from the first capture device to the second capture device. The transfer zone may be identified based on the first capture device, the second capture device, or a combination of the first and second capture devices. In some embodiments, the first capture device may be directed towards the transfer zone. In some embodiments, the second capture device may be directed towards the transfer zone.

In some embodiments, a capture operation of a video steam of a subject located in an environment may be identified. The capture operation may be performed by a first capture device from a first perspective on the subject. A perspective update request of the video stream is received. One or more candidate capture devices in the environment are detected in response to the perspective update request. A second capture device is selected from the one or more candidate capture devices as a selected capture device. The second capture device is instructed to perform the capture operation based on the selected capture device. The video stream is transferred and/or transitioned from the first capture device to the second capture device. The transfer updates the video stream from the first perspective to a second perspective of the subject. The selected capture device may be a candidate that is closed in perspective to first perspective.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may include a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may include a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may include an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two
- or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
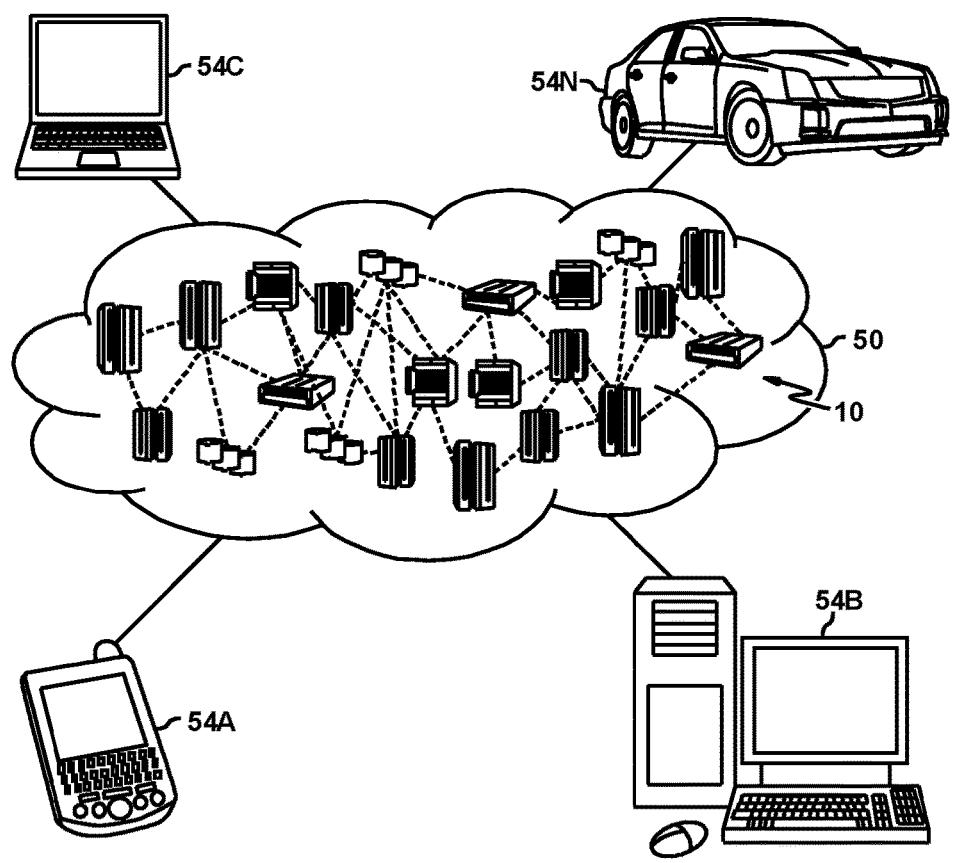
FIG. 2 depicts a cloud computing environment according to an embodiment of the present invention.
Figure 3:
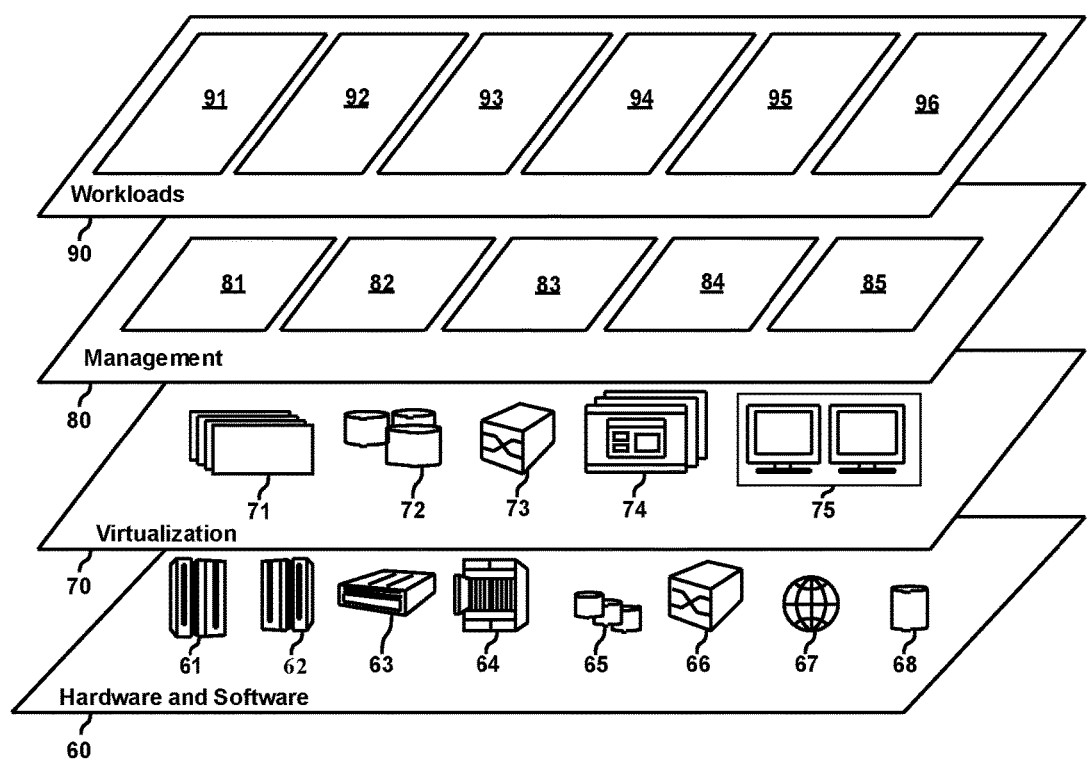
FIG. 3 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68. Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and MVC 96.

Figure 4:
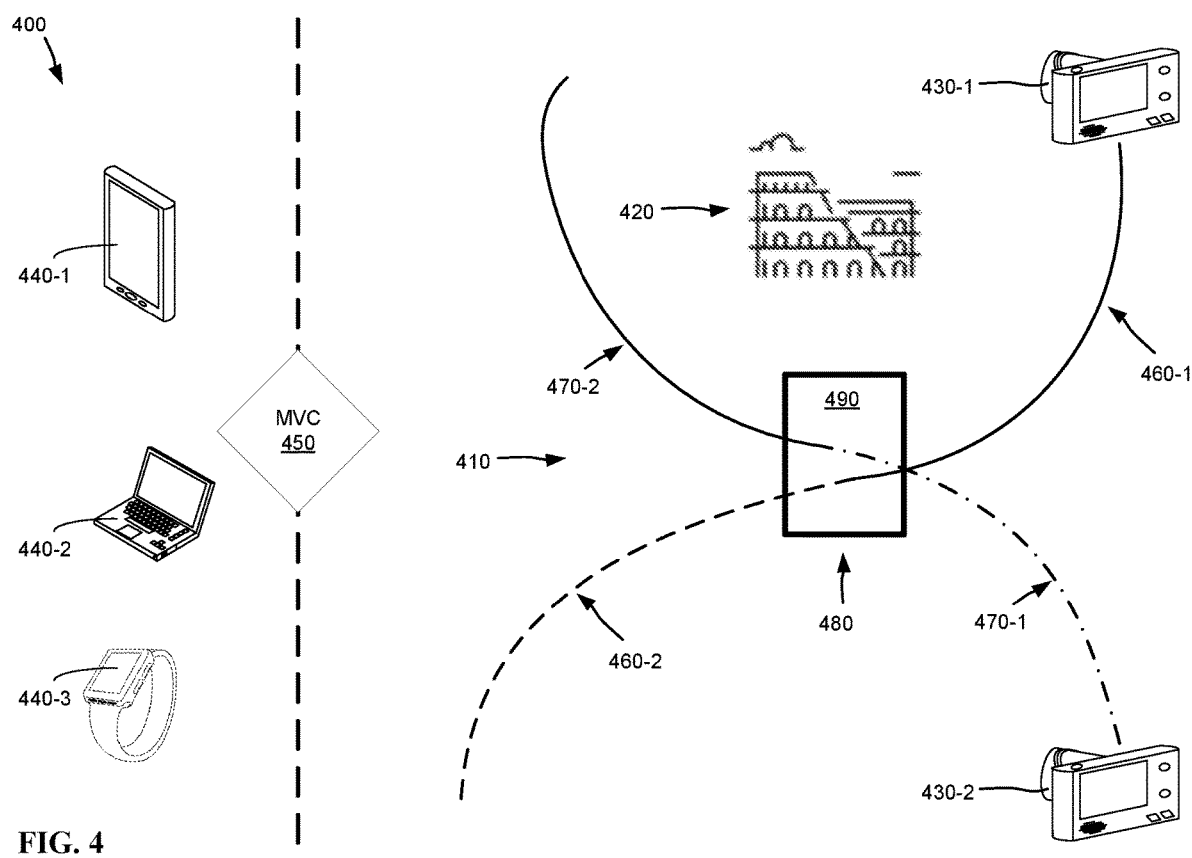
FIG. 4 depicts an example system of capturing an environment from multiple capture devices while maintain perspective of a video stream, consistent with some embodiments of the disclosure.

FIG. 4 depicts an example system 400 of capturing an environment 410 from multiple capture devices while maintaining the perspective of a video stream, consistent with some embodiments of the disclosure. Specifically, system 400 may be configured to perform Multiple Entity Video Capture Coordination. System 400 may operate in the environment 410, to perform one or more capture operations, such as to capture a subject 420 in the environment 410. The subject 420 may be a fixed or moving object that is located within the environment 410. In this example, the subject 420 may be a building that is located at a site or defined region, such as a city center. However, the subject 420 may alternatively be a statue, monument, person, activity, or some combination.

System 400 may include the following: one or more capture devices 430-1, and 430-2 (collectively, capture devices 430); one or more viewing devices 440-1, 440-2, and 440-3 (collectively, viewing devices 440); and an MVC 450. Though depicted as two capture devices 430 and three viewing devices 440 in FIG. 4, more or fewer devices may be anticipated without differing in scope of the various embodiments of the disclosure. The capture devices may be computing devices capable of capturing a video stream, such as smartphones, UAVs, action cameras, and the like. The viewing devices 440 may be computing devices capable of viewing and providing input regarding updating a perspective, such as finger-based gestures, keyboard input, mouse or pointer input, wearable gestures, and the like. In this example, the viewing devices 440-1, 440-2, and 440-3 may be a PDA, laptop, and smartwatch, respectively.

The MVC 450 may be software, hardware, or some combination. The MVC 450 may be operable as a single computing device, such as computer 100. The MVC 450 may operate as an abstracted computing entity, such as an entity within a cloud computing environment 50. The MVC 450 may be a standalone computer system, e.g., that is separate from the other components of system 400. The MVC 450 may be a component of one of the other components of system 400, such as being embedded into a capture device 430, a viewing device 440, or some combination.

The MVC 450 may be configured to transfer operation between capture devices 430 while maintaining a perspective of the subject 420 in the environment 410. Specifically, the MVC 450 may identify the capture devices 430 and their operation. Capture device 430-1 may be moving through the environment 410, as indicated by lines 460-1, 460-2 (collectively referred to as line 460). Capture device 430-2 may be also moving through the environment 410, as indicated by lines 470-1, 470-2 (collectively referred to as line 470). The capture device 430-2 may be performing a capture operation, as indicated by the solid portion of line 460 (e.g., line 460-1). The MVC 450 may identify this as a capture operation of a video stream. The video stream may be publicly broadcast to the viewing devices 440. The capture device 430-1 may be panning while maintaining a perspective, specifically, a view that is directed at subject 420 in the environment 410. The capture device 430-1 may be moving, as indicated by line 460.

At some point, capture device 430-1 may experience a capture limitation. The capture limitation may be a low battery, a lack of storage, a pause in movement, or some other issue related to performing or continuing a capture operation of capture device 430-1. The capture limitation may be a failure of the capture device 430-1 to perform capture operations of the environment 410. For example, the viewing devices may indicate a desire for the video stream, that is being capture and provided by capture device 430-1, to continue. Specifically, the viewing devices may indicate to MVC 450, a request for the perspective to continue uninterrupted around the subject 420.

In response to determining there is a capture limitation, the MVC 450 may operate to seamlessly or uninterruptedly hand off or transfer the video stream to another capture device. Specifically, the MVC 450 may broadcast to other capture devices in the area of or within the environment 410. The broadcast request may be for other capture devices to respond and to be ready to take on capturing the subject 420 consistent with the viewing requests of the viewing devices 440.

Responsive to the request, candidate capture devices 430 may be identified by MVC 450, and a second capture device may be selected. Specifically, capture device 430-2 may in the environment 410 and may be moving, as indicated by the dotted section 470-1 of line 470. Capture device 430-2 may be identified, by MVC 450, and may selected and instructed to also perform capture operations of the subject 420.

The instructions and transferring, by MVC 450, may include directing of the capture devices 430 to become proximate to or intersect each other. For example, a line 460 that indicates the movement of capture device 430-1 and line 470 that indicates the movement of capture device 430-2 may be determined by MVC 450. These movements may be identified based on measuring or analyzing the sensors embedded into the capture devices 430, such as GPS, movement, and other relevant location and position sensors. The MVC 450 may designate a transfer zone 490. The transfer zone 490 may be an area or location where each of the capture devices are directed to meet up or go to at a similar time.

The MVC 450 may make one or more adjustments to the capture device 430-2 to mimic, duplicate, or otherwise match the perspective of the capture device 430-1. For example, when each of the capture devices 430 are within the transfer zone 490, capture device 430-2 may be somewhat closer in position to the subject 420 than that of capture device 430-1. As a result of the position different, the perspective of the video stream may have a first FOV from the position of the capture device 430-1. This first FOV may be wider than the FOV of the capture device 430-2 that is relatively closer to the subject 420. The MVC 450 may determine the position, the direction, the FOV, and other relevant aspects of the perspectives of each of the capture devices 430. The MVC 450 may generate one or more adjustments for the capture device 430-2, to match the perspective of the capture device 430-1. For example, the adjustments may be to adjust to a relatively wider FOV of the capture device 430-2. In another example, the adjustments may be to adjust an angle or direction of the capture device 430-2. The adjustments may be provided to a user of capture device 430-2, such as through arrows, descriptions, or the like.

The MVC 450, may instruct capture device 430-2 to begin capturing the subject 420. The MVC 450 may further instruct for transfer of the video stream from the capture device 430-1 to capture device 430-2, at a location 480. During the transfer, at 480, the perspective of the video stream may not change in perspective, from the view of the viewing devices 440. The capture operation of the video stream may continue as capture device 430-1 is no longer capturing the video, as shown by portion 460-2 of line 460. The capture operation of the video stream may continue by capture device 430-2 as indicated by portion 470-2 of line 470.

Figure 5:
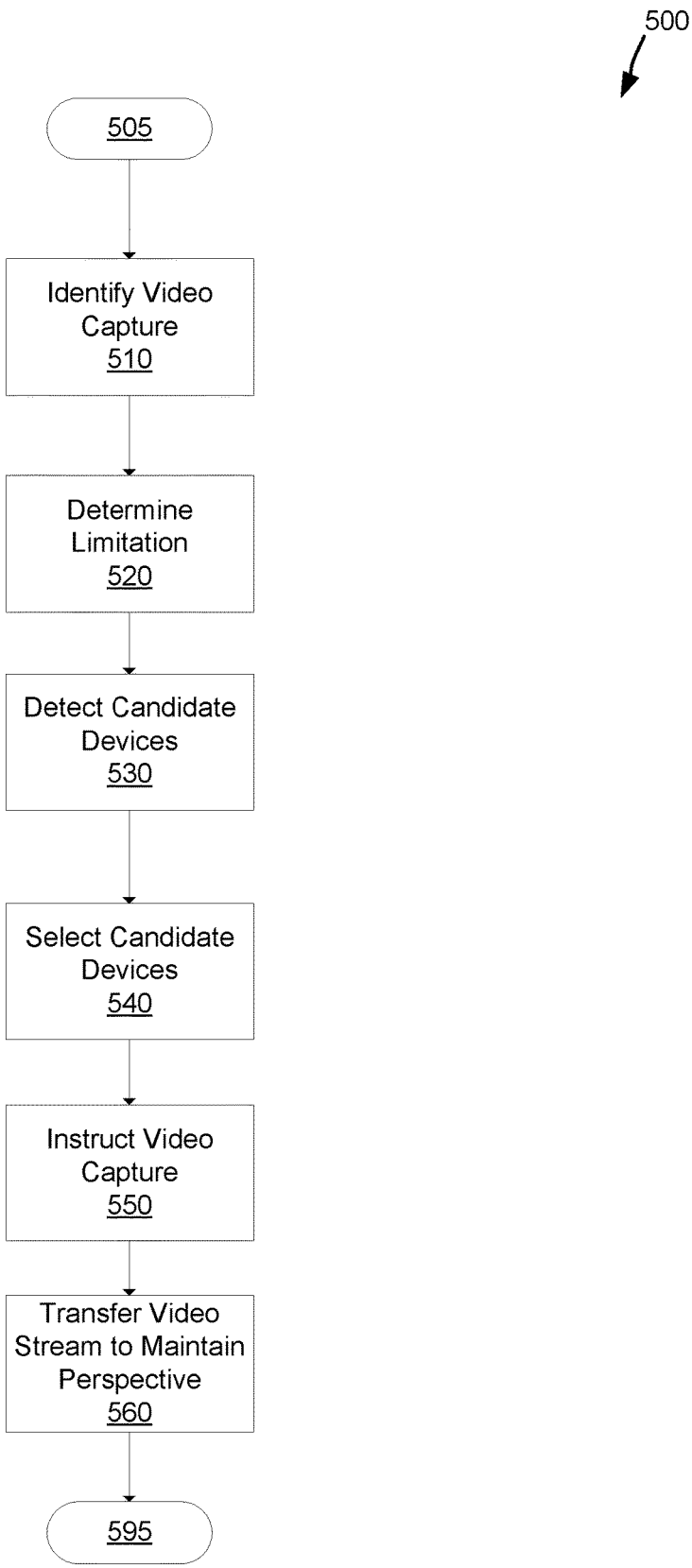
FIG. 5 depicts an example method of maintaining a perspective in a video stream, consistent with some embodiments of the disclosure.

FIG. 5 depicts an example method 500 of maintaining a perspective in a video stream, consistent with some embodiments of the disclosure. Method 500 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). In another example, method 500 may be performed by an MVC, such as MVC 450.

From start 505, a capture operation of a video stream may be identified at 510. The video stream may be of a subject. The identification may be in response to a signal for a video stream to begin, such as from a viewing device requesting capture devices to begin broadcasting a video. The identification may be of an existing video stream that is being captured. The capture operation may be performed by a first capture device. The subject of the video stream may be located in an environment. The video stream may include a perspective of the subject, such as a video that is of the front of an exhibit and the video may be panning around the subject at a rate of a two feet per minute from a distance of approximately thirty feet.

At 520 a capture limitation of the first capture device may be determined. The capture limitation is related to the first capture device capturing the subject. For example, the first capture device may be a user with a handheld camera that is walking through a field of grass, rocks and trees around the exhibit. The terrain may be uneven or rocky and it may be difficult for the user to continue moving the capture device around the exhibit. The capture limitation may be directly related to the first capture device. For example, a UAV may be circling around the exhibit and the UAV may be running low on battery.

At 530 one or more candidate capture devices may be detected. The candidate capture devices may be detected in response to the limitation being determined at 520. For example, as long as the first capture device is successfully able to perform the capture without a limitation, it may not be necessary to begin detecting additional capture devices. The detection may include broadcasting, such as through a local computer network, for other available candidate capture devices. The detection may be restricted to only the area or environment of the capture subject. The detection may be passive; one or more candidate capture devices may continually broadcast their availability to perform capture operations while in the environment (e.g., other users in the environment around the exhibit).

At 540, a second capture device may be selected as a selected capture device. The selected capture device may be selected from the one or more candidate capture devices. The selection may be based on a lack of a capture limitation from the candidate capture devices.

At 550, the selected capture device may be instructed to perform the capture operation. The instruction may be for the second capture device to perform the capture operation in addition to the first capture device. The simultaneous capture may be used for updating or adjusting the perspective of the second capture device. For example, the video stream may be of a first perspective, and the capture of the second capture device may be of a second perspective. The first perspective and the second perspective may be compared and one or more adjustments may be generated for adjusting the second capture operation. The adjustments may be to match the position, the direction, the field of view of the second capture device. The adjustments may be for an adjusted direction and field of view as the two capture devices may not be able to occupy the same space. For example, if the second capture device is slightly behind the first capture device, the perspective of the second capture device may be zoomed, an FOV may be tightened, an image may be cropped, or other relevant adjustment.

At 560 the video stream may be transferred from the first capture device to the second capture device. The transfer may maintain the perspective. Specifically, the video stream before, during, and after the transfer may be continuous uninterrupted or otherwise visually coherent such that the perspective appears to have been maintained.

After the video stream is transferred, at 560, method 500 may end at 595.

Figure 6:
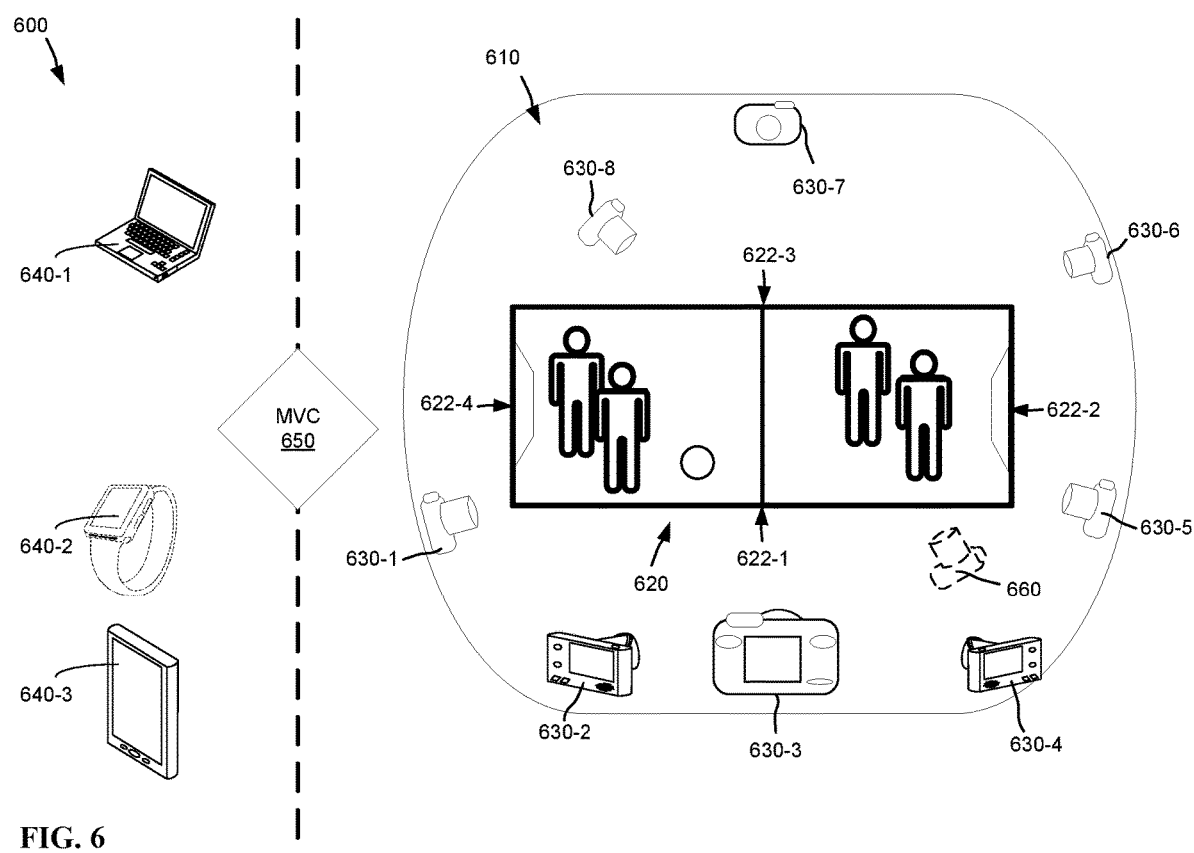
FIG. 6 depicts an example system of capturing an environment from multiple captures devices while changing a perspective, consistent with some embodiments of the disclosure.

FIG. 6 depicts an example system 600 of capturing an environment 610 from multiple captures devices while changing a perspective, consistent with some embodiments of the disclosure. Specifically, system 600 may be configured to perform Multiple Entity Video Capture Coordination. System 600 may operate in the environment 410, to perform one or more capture operations, such as to capture a subject 620 in the environment 610. The subject 620 may be a fixed or moving object that is located within the environment 610, such as a building, statue, monument, person, activity, or some combination. For example, subject 620 may be a sporting event. The subject 620 may have differing sides 622-1, 622-2, 622-3, and 622-4 (collectively, sides 622). The sides 622 may be differing views or positions that are around the subject 620. For purposes of discussion, side 622-1 may be a near side, side 622-3 may be a far side, side 622-2 may be a right side, and side 622-5 may be a left side.

System 600 may include the following: one or more capture devices 630-1, 630-2, 630-3, 630-4, 630-5, 630-6, 630-7, and 630-8 (collectively, capture devices 430); one or more viewing devices 440-1, 440-2, and 440-3 (collectively, viewing devices 440); and an MVC 650. Though depicted as eight capture devices 430 and three viewing devices 440 in FIG. 6, more or fewer devices may be anticipated without differing in scope of the various embodiments of the disclosure. The capture devices 630 may be computing devices capable of capturing a video stream, such as smartphones, UAVs, action cameras, and the like. The viewing devices 640 may be computing devices capable of viewing and providing input regarding updating a perspective, such as finger-based gestures, keyboard input, mouse or pointer input, wearable gestures, and the like.

The MVC 650 may be software, hardware, or some combination. The MVC 650 may be operate as a single computing device, such as computer 100. The MVC 650 may operate as an abstracted computing entity, such as cloud computing environment 50. The MVC 650 may be a stand-alone computer system, e.g., that is separate from the other components of system 600. The MVC 650 may be a component of one of the other components of system 600, such as being embedded into a capture device 630, a viewing device 640, or some combination.

The MVC 650 may be configured to transfer operation between capture devices 630 while changing perspectives of the subject 620 in the environment 610. Specifically, the MVC 650 may identify the capture devices 630 and their operation. Capture device 630-1 may be positioned throughout the environment 610. In detail, some of the capture devices 630 may be located on one of the sides 622 of the subject 610. For example, capture devices 630-2, 630-3, and 630-4 may be located on side 622-1, and capture devices 630-7 and 630-8 may be located on side 622-3. Some of the capture device 630 may be located proximate to multiple sides 622. For example, capture device 630-1 may be proximate to sides 622-1 and 622-4. Continuing the example, capture device 630-5 may be proximate to sides 622-1 and 622-2. Further continuing the example, capture device 630-6 may be proximate to sides 622-2 and 622-3. The capture devices 630 may be actively recording an aggregating video that is broadcast out as a video stream.

The MVC 650 may identify this as a capture operation of a video stream. The video stream may be publicly broadcast to the viewing devices 640. The viewing devices 640 may be configured to provide perspective update requests regarding the video stream. For example, a viewing device 640-1 may be viewing the video stream of capture device 630-3. The perspective of capture device 630-3 may be of the front side 622-1 of the subject 620. The viewing device 640-1 may receive one or more inputs, gestures, voice commands, and the like to adjust the perspective to a new perspective. The inputs may be captured and may be sent as a perspective update request.

The MVC 650 may receive the perspective update request. The MVC 650 may respond to the perspective update request by seeking a second capture device 630 to switch to from a first capture device 630. The second capture device 630 may be selected from one or more candidate capture devices. The selection may be based on identifying a second capture device 630 that has a logical or cogent second perspective to switch to from the perspective of the first capture device. For example, a video stream may be from the perspective of capture device 630-4. The MVC 650 may receive a perspective update request that includes a request to provide a view that is closer to the side 622-2. The MVC 650 may compare the perspective update request to the video feeds of the various capture devices 630 and the MVC 650 may select the capture device 630-5 based on the perspective being relatively close to the requested perspective. The closeness of the perspective may be a closeness in position, direction, FOV, or other attribute.

The selecting may include determining an ideal perspective 660 within the environment 610 for capturing the subject. For example, the MVC 650 may receive an input from one of the viewing devices 640 that are currently viewing the subject 620 from the perspective of the capture device 630-5. The input may include a perspective update request with one or more defined viewing parameters. The defined viewing parameters that make up the ideal perspective 660 may be equivalent to a perspective of a theoretical capture device; a capture device that does not actually exist. The MVC 650 may make a comparison between the ideal perspective 660 and the perspectives of the other capture devices 630 to select a capture device. The MVC 650 may identify additional perspectives of the additional capture devices 630 and may generate a list of the additional perspectives. The list may be used to determine a candidate capture device from the capture devices 630, e.g., by ranking, sorting, or valuing a capture device more or less based on its ability to respond to the perspective update request.

The MVC 650 may determine that a difference between various perspectives of the capture devices 630 is beyond a predetermined perspective threshold. For example, the video stream may be captured from a perspective of the capture devices 630-7 and the perspective update request is to provide a perspective that is near the side 622-4. The MVC 650 may select the capture device 630-1 as being the selected capture device based on the perspective update request. The MVC 650 may determine that the difference between the perspective of the capture devices 630-1 and 630-7 is beyond a predetermined perspective threshold. The predetermined perspective threshold may be based on the perspective change being disruptive to successfully tracking the subject 620. For example, a predetermined perspective threshold may include a number of degrees difference in rotation that is greater than forty-five degrees. In another example, a predetermined perspective threshold may include a position change that is greater than twelve feet. In yet another example, a predetermined perspective threshold may include an updated perspective where the subject 620 has moved outside of the middle third of the video stream. Responsive to determining the predetermined perspective threshold has been exceeded, the MVC 650 may make one or more adjustments to the capture devices 630. For example, the MVC 650 may generate a set of perspective adjustments of the capture device 630-7 that is currently capturing the video stream, by providing to capture device 630-7 to rotate, pan, or zoom out to get a wider FOV of the subject 620. In another example, the MVC 650 may generate and provide a set of perspective adjustments to the capture device 630-1.

The MVC 650 instructs the selected captured device of the capture devices 630 to also perform the capture operation, as multiple capture devices 630 may be simultaneously capturing the subject 620. The MVC 650 transfers the video stream to the second capture device of the capture devices 630. The transfer may update the perspective to a second perspective.

Figure 7:
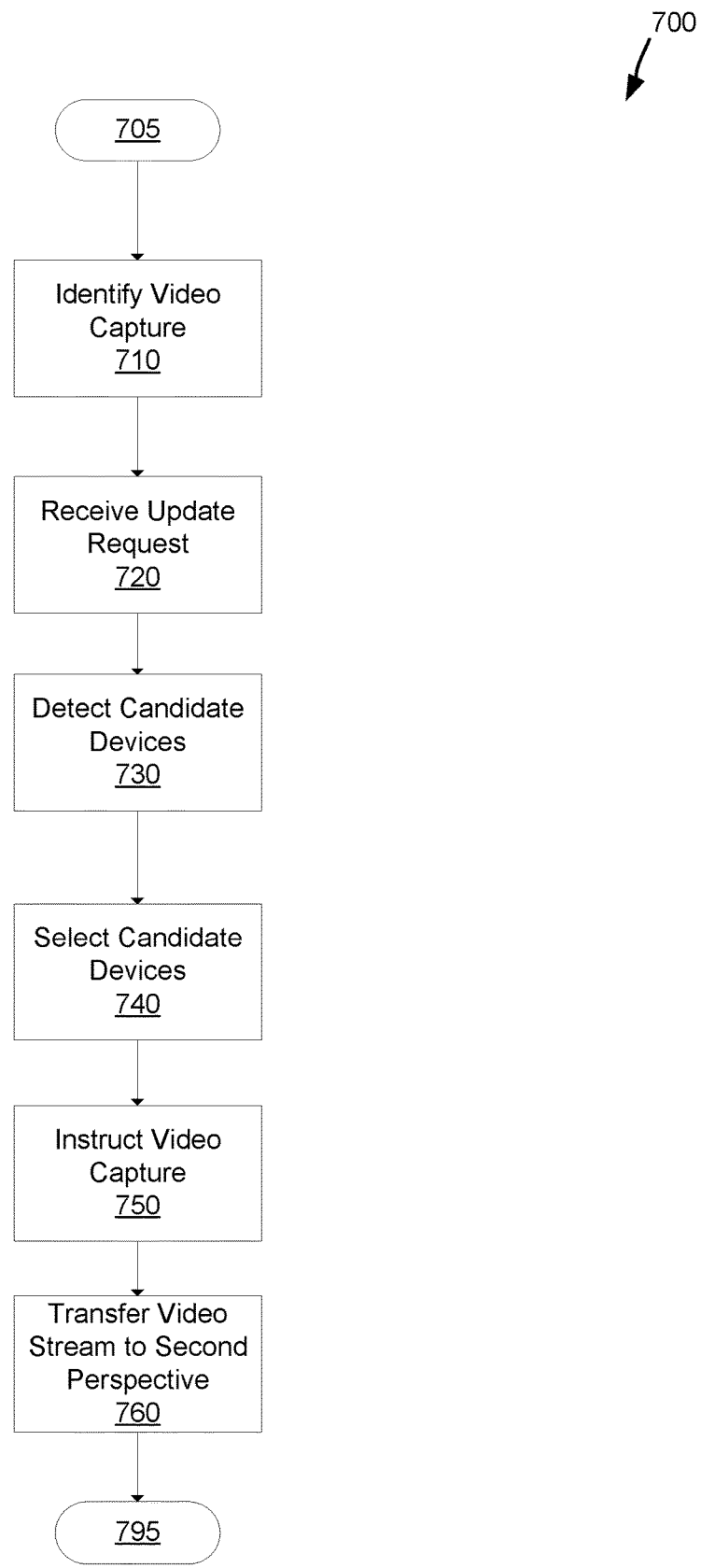
FIG. 7 depicts an example method of changing a perspective in a video stream, consistent with some embodiments of the disclosure.

FIG. 7 depicts an example method 700 of changing a perspective in a video stream, consistent with some embodiments of the disclosure. Method 700 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.). In another example, method 700 may be performed by an MVC, such as MVC 650.

From start 705, a capture operation of a video stream may be identified at 710. The video stream may be of a subject. The identification may be in response to a signal for a video stream to begin, such as from a viewing device requesting capture devices to begin broadcasting a video. The identification may be of an existing video stream that is being captured. The capture operation may be performed by a first capture device. The subject of the video stream may be located in an environment. The video stream may include a first perspective of the subject, such as a video that is of the front of a performer from twenty feet away.

At 720 a request to update a perspective may be received. The perspective update request may include parameters such as a change in position, rotation, field of view, or other defined viewing parameter. The perspective update request may be from a single viewing device. the perspective update request may be from a plurality of viewing devices.

At 730 one or more candidate capture devices may be detected. The candidate capture devices may also be in the environment of the first capture device. For example, additional video capture devices may be located around the performer in other positions, rotations, and fields of view. The candidate capture devices may be detected in response to the perspective update request being received at 720. For example, as long as the first capture device is successfully able to perform the capture without a limitation, it may not be necessary to begin detecting additional capture devices. The detection may include broadcasting, such as through a local computer network, for other available candidate capture devices. The detection may be restricted to only the area or environment of the capture subject. The detection may be passive; one or more candidate capture devices may continually broadcast their availability to perform capture operations while in the environment (e.g., other users in the environment around the performer).

At 740 a second capture device may be selected as a selected capture device. The selected capture device may be selected from the one or more candidate capture devices. The selection may be based on a matching or relatively close to matching perspective to the request. For example, a request may include a perspective that is to the side of a performer, and one or more candidates may be analyzed to determine if they match the side of the performer. The selection may further include determining an average of the perspective update request; specifically, an average of multiple perspective update requests, that may be received at 720.

At 750 the selected capture device may be instructed to perform the capture operation. The instruction may be for the second capture device to perform the capture operation in addition to the first capture device.

At 760 the video stream may be transferred from the first capture device to the second capture device. The transfer may update the perspective. Specifically, the video stream before the transfer may be of the first perspective. And after the transfer, at 760, the video stream may be of the second perspective.

After the video stream is transferred, at 760, method 700 may end at 795.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
identifying a capture operation of a video stream of a subject, wherein the capture operation is performed by a first capture device, wherein the subject is located in an environment, and wherein the video stream includes a perspective of the subject;
determining a capture limitation of the first capture device, wherein the capture limitation is related to the first capture device capturing the subject;
detecting, in response to the capture limitation, one or more candidate capture devices in the environment;
selecting, from the one or more candidate capture devices, a second capture device as a selected capture device;
instructing, based on the selected capture device, the second capture device to perform the capture operation; and
transferring the video stream from the first capture device to the second capture device, wherein the transferring maintains the perspective.

2. The method of claim 1, wherein the capture limitation is related to a first power status of the first capture device.

3. The method of claim 2, wherein the second capture device is selected from the candidate capture devices based on the second capture device having a second power status that is greater than the first power status.

4. The method of claim 1, wherein the detecting the one or more candidate capture devices further comprises:
transmitting a network request for capture devices, wherein the network request is broadcast within a proximity of the environment; and
receiving, in response to the network request, a response from the one or more capture devices.

5. The method of claim 1, wherein the method further comprises:
receiving one or more defined viewing parameters, wherein the defined viewing parameters relate to the video stream; and
adjusting, in response to the one or more defined viewing parameters, the capture operation.

6. The method of claim 5, wherein the one or more defined viewing parameters is selected from the group consisting of a change in position during the video stream, a change in direction during the video stream, and a change in field of view during the video stream.

7. The method of claim 5, wherein:
the capture limitation is related to an inability of the first capture device to complete the one or more defined viewing parameters; and
the second capture device is selected from the candidate capture devices based on the second capture device responding to the one or more defined viewing parameters.

8. The method of claim 5, wherein the one or more defined viewing parameters are received from one or more viewing devices.

9. The method of claim 1, wherein the first capture device moves through the environment in a first direction towards a position in the environment.

10. The method of claim 9, wherein the selecting the second capture device further comprises:
determining, from the one or more candidate capture devices in the environment, that the second capture device is moving towards the position.

11. The method of claim 9, wherein the selecting the second capture further comprises:
determining, from the one or more candidate capture devices in the environment, that the second capture device is proximate to the position.

12. The method of claim 1, wherein the method further comprises:
identifying, based on the first capture device and before the transferring the video stream from the first capture device to the second capture device, a transfer zone that is within the environment.

13. The method of claim 12, wherein the method further comprises:
directing the first capture device towards the transfer zone.

14. The method of claim 12, wherein the method further comprises:
directing, before the instructing of the second capture device to perform the capture operation, the second capture device towards the transfer zone.

15. The method of claim 1, wherein:
the first captured device is located at a first position in the environment;
the second capture device is located at a second position in the environment;
the identifying of the capture operation includes identifying the perspective of the subject that is related to the first position; and
the method further comprises:
determining a second perspective of the second capture device, the second perspective being related to the second position in the environment;
generating, based on the second perspective, one or more adjustments to the second capture device to match the perspective of the subject from the second position in the environment to the perspective of the subject that is related to the first position; and
providing, before the instructing the second capture device to perform the first capture operation, the one or more adjustments to the second capture device.

16. The method of claim 15, wherein:
the second capture device is a user-operate capture device with a display; and
the providing the one or more adjustments includes rendering the one or more adjustments on the display.

17. A system, the system comprising:
   a memory, the memory containing one or more instructions; and
   a processor, the processor communicatively coupled to the memory, the processor, in response to reading the one or more instructions, configured to:
      identify a capture operation of a video stream of a subject, wherein the capture operation is performed by a first capture device, wherein the subject is located in an environment, wherein the video stream includes a perspective of the subject;
      determine a capture limitation of the first capture device, wherein the capture limitation is related to the first capture device capturing the subject;
      detect, in response to the capture limitation, one or more candidate capture devices in the environment;
      select, from the one or more candidate capture devices, a second capture device as a selected capture device;
      instruct, based on the selected capture device, the second capture device to perform the capture operation; and
      transfer the video stream from the first capture device to the second capture device, wherein the transfer maintains the perspective.

18. The system of claim 17, wherein the processor is further configured to:
   receive one or more defined viewing parameters, wherein the defined viewing parameters relate to the video stream; and
   adjust, in response to the one or more defined viewing parameters, the capture operation.

19. A computer program product, the computer program product comprising:
   one or more computer readable storage media; and
   program instructions collectively stored on the one or more computer readable storage media, the program instructions configured to:
      identify a capture operation of a video stream of a subject, wherein the capture operation is performed by a first capture device, wherein the subject is located in an environment, wherein the video stream includes a perspective of the subject;
      determine a capture limitation of the first capture device, wherein the capture limitation is related to the first capture device capturing the subject;
      detect, in response to the capture limitation, one or more candidate capture devices in the environment;
      select, from the one or more candidate capture devices, a second capture device as a selected capture device;
      instruct, based on the selected capture device, the second capture device to perform the capture operation; and
      transfer the video stream from the first capture device to the second capture device, wherein the transfer maintains the perspective.

20. The computer program product of claim 19, wherein the program instructions are further configured to:
   receive one or more defined viewing parameters, wherein the defined viewing parameters relate to the video stream; and
   adjust, in response to the one or more defined viewing parameters, the capture operation.

* * * * *